United States Patent [19]

Ruffolo, Jr.

[11] Patent Number: 5,390,837
[45] Date of Patent: Feb. 21, 1995

[54] SNOWBOARD RACK

[75] Inventor: Ralph J. Ruffolo, Jr., Kenosha, Wis.

[73] Assignee: Ruffolo Enterprises, Inc., Kenosha, Wis.

[21] Appl. No.: 147,929

[22] Filed: Nov. 5, 1993

Related U.S. Application Data

[63] Continuation-in-part of Ser. No. 4,737, Feb. 11, 1993, Pat. No. Des. 350,109.

[51] Int. Cl.6 ................................................ B60R 9/00
[52] U.S. Cl. ...................... 224/42.45 R; 224/42.46 R; 224/42.43; 248/205.6; 248/206.2; 248/201
[58] Field of Search ............. 224/273, 42.43, 42.45 R, 224/42.46 R, 42.39, 214, 250, 324; 248/201, 205.5, 205.6, 205.7-206.3, 499; 211/87, 89; D12/406

[56] References Cited

U.S. PATENT DOCUMENTS

| | | | |
|---|---|---|---|
| 2,157,001 | 5/1939 | Morley | 248/205.6 |
| 2,302,300 | 11/1942 | Davies | 224/42.45 R |
| 2,502,714 | 4/1950 | Garnett | 248/499 X |
| 2,549,391 | 4/1951 | Secord | 211/87 |
| 2,563,698 | 8/1951 | Whitebread | 248/499 |
| 3,286,892 | 11/1966 | Marshall | 224/317 |
| 3,333,750 | 8/1967 | Porter | 224/320 |
| 3,701,436 | 10/1972 | Adams | 224/42.45 R |
| 4,077,554 | 3/1978 | Goode | 224/42.46 R |
| 4,154,356 | 5/1979 | Schieve | 248/222.1 X |
| 4,231,501 | 11/1980 | Goode | 224/42.46 R |
| 4,691,851 | 9/1987 | Aaserude | 224/42.45 R |

FOREIGN PATENT DOCUMENTS

| | | | |
|---|---|---|---|
| 0068032 | 7/1944 | Norway | 224/214 |
| 0179813 | 6/1962 | Sweden | 224/324 |

OTHER PUBLICATIONS

Copy of Design Trademark Certificate Reg. No. 1,409,973 issued Sep. 16, 1986 of Ralph J. Ruffolo, d/b/a Ruffolo Enterprises, Inc., depicting ski rack design for mounting skis on vehicles in use as early as 1979.
Two-sided brochure entitled "Ski-Hiker II" which advertises the product depicted in Trademark Reg. No. 1,409,973 by use of artists's sketches.
One-sided advertising handout showing early use (approximately 1973-1974) of Ruffolo Enterprises Ski--Hiker design by actual photographs and instructions.
Two Original advertising brochures for the Ruffolo Board Hiker TM ski board rack, Nov. 6, 1992.

Primary Examiner—J. Casimer Jacyna
Attorney, Agent, or Firm—Leydig, Voit & Mayer Ltd.

[57] ABSTRACT

A snowboard rack which is readily mountable to any roll-up window on an automotive vehicle. The carrier includes a base unit which has a suction cup for securing the base unit to the exterior surface of the window. A bracket is secured to the base unit. The bracket has two ends, one of which is secured to the base unit. The other end of the bracket forms a U-shaped hanger which engages the top of the window. A support arm is secured to the bracket and extends away from the window exterior surface at a substantial angle above the horizontal. The support arm includes a hooked end opposite the end secured to the bracket. In use, the snowboards being carried are supported by the support arm. The carrier also includes a securing strap having a first end secured adjacent to the base unit. The second end includes openings which are received on the hook end of the support arm. With the snowboards in place on the support arm, the securing strap is stretched over the boards and attached to the hook such that the boards are held in place between the securing strap and the support arm. Presumably, the support arm extends above the horizontal at an angle of 30°. The bracket is composed of a nylon material, and the U-shaped hanger is flexible. This allows the U-shaped hanger to adapt to various thicknesses of windows so that the carrier can readily be mounted to a variety of automobiles.

11 Claims, 4 Drawing Sheets

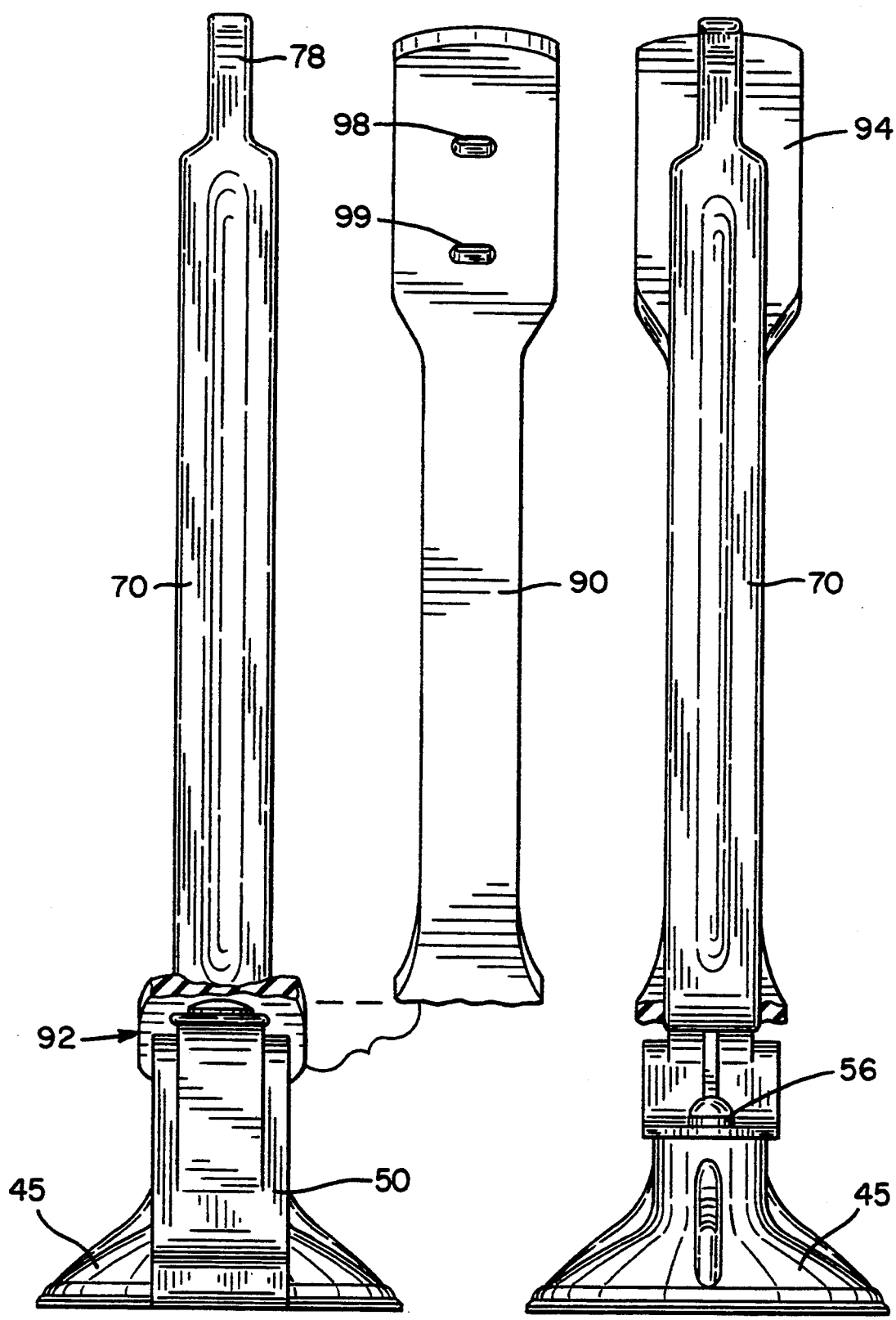

SNOWBOARD RACK

RELATED APPLICATIONS

This application is a continuation-in-part of application Ser. No. 29/004,737, filed Feb. 11, 1993, now U.S. Pat. Des. No. 350,109.

FIELD OF THE INVENTION

This invention relates generally to a carrier for an automobile, and particularly to a window mounted rack for holding one or more snowboards.

BACKGROUND OF THE INVENTION

Various types of support racks such as those for carrying skis or other snow sport related equipment, that mount on an automobile, are commercially available. Such racks are typically adapted to be mounted on the roof, trunk, or rear bumper of the automobile. However, many automobiles do not have trunks making trunk-mounted racks impractical. Furthermore, many roof racks require attachment to drip moldings or gutters above the side windows of the automobile. However, many present automobile designs do not have such gutters in order to improve the aerodynamic look and performance of the automobile. These roof-mounted racks are thus also not usable on these automobiles.

Some prior art carriers have overcome these shortcomings by providing racks which are mountable on either the side or rear window of the automobile for carrying a variety of articles. Examples of such window-mounted racks can be seen in the following U.S. Pat. Nos. 4,231,501 to Goode; 2,157,001 to Morley; 2,302,300 to Davies; 2,549,391 to Secoral; 3,286,892 to Marshall; and 3,333,750 to Porter. Various ones of such carriers, however, are not without significant drawbacks. For example, some such racks can seriously impair visibility. Not only are the racks themselves in the line of sight, but the objects which are being carried are also. Since many states and municipalities have regulations prohibiting obstruction of the line of sight of an automobile, use of some carriers may be in violation of such regulations.

Some of such carriers also present aerodynamic problems as the structure of the carriers extends generally perpendicularly away from the surface of the vehicle. This can create undue drag. Moreover, by virtue of this perpendicular projection away from the side of the automobile, some article carriers may project beyond the largest profile of the automobile. Some municipalities, or even foreign countries, have laws prohibiting an automobile attachment from projecting beyond an automobile's largest profile, as viewed end-on. Any of the prior art carriers projecting away from this profile would be unusable in these circumstances.

Certain ones of such carriers may also be inconvenient to use since the metal hangers which support the carriers on the glass are too bulky to allow the window to roll up fully and seat into the rubber door seal. Since such carriers are generally used in cold-weather climates, such an unsealed window could prove to be a significant inconvenience.

SUMMARY OF THE INVENTION

It is thus a primary object of the invention to provide a window-mounted rack for snowboards that overcomes the problems existing in the prior art, and that provides a carrier that is safe, reliable, and adaptable to a variety of windows.

It is a related object to provide a carrier for snowboards and the like that allows for maximum visibility while providing the necessary stability.

It is a further related object to provide a snowboard carrier that can absorb the shocks and stresses exerted on an automobile by the road surface.

Another object is to provide a snowboard carrier that causes a minimum of drag on the automobile.

A related object is to provide a snowboard carrier that projects a minimum amount away from the automobile profile.

Another object is to provide a snowboard carrier that allows the window to fully seal within the rubber door seal.

In accord with these and other objects, there is provided a snowboard rack which is readily mountable to any roll-up window on an automotive vehicle. The carrier includes a base unit which has a suction cup for securing the base unit to the exterior surface of the window. A bracket is secured to the base unit. The bracket has two ends, one of which is secured to the base unit. The other end of the bracket forms a U-shaped hanger which engages the top of the window. A support arm is secured to the bracket and extends away from the window exterior surface at a substantial angle above the horizontal. The support arm includes a hooked end opposite the end secured to the bracket. In use, the snowboards being carried are supported by the support arm. The carrier also includes a securing strap having a first end secured adjacent to the base unit. The second end includes openings which are received on the hook end of the support arm. With the snowboards in place on the support arm, the securing strap is stretched over the boards and attached to the hook such that the boards are held in place between the securing strap and the support arm.

According to a preferred embodiment of the invention, the support arm extends above the horizontal at an angle of 30°. The bracket is composed of a nylon material, and the U-shaped hanger is flexible. This allows the U-shaped hanger to adapt to various thicknesses of windows so that the carrier can readily be mounted to a variety of automobiles.

There is thus provided a simple to manufacture snowboard carrier which is also simple to mount and use. The carrier has superior visibility characteristics as well as having other significant safety and adaptability features.

BRIEF DESCRIPTION OF THE DRAWINGS

FIG. 4 is an elevational top view of a snowboard carrier according to the invention;

FIG. 5 is an elevational bottom view of the snowboard carrier according to the invention;

DETAILED DESCRIPTION OF THE PREFERRED EMBODIMENTS

While the invention will be described in reference to certain preferred embodiments, this is not done by way of limitation. Rather, the invention is intended to cover all matter as within the scope of the appended claims.

Figure 1:
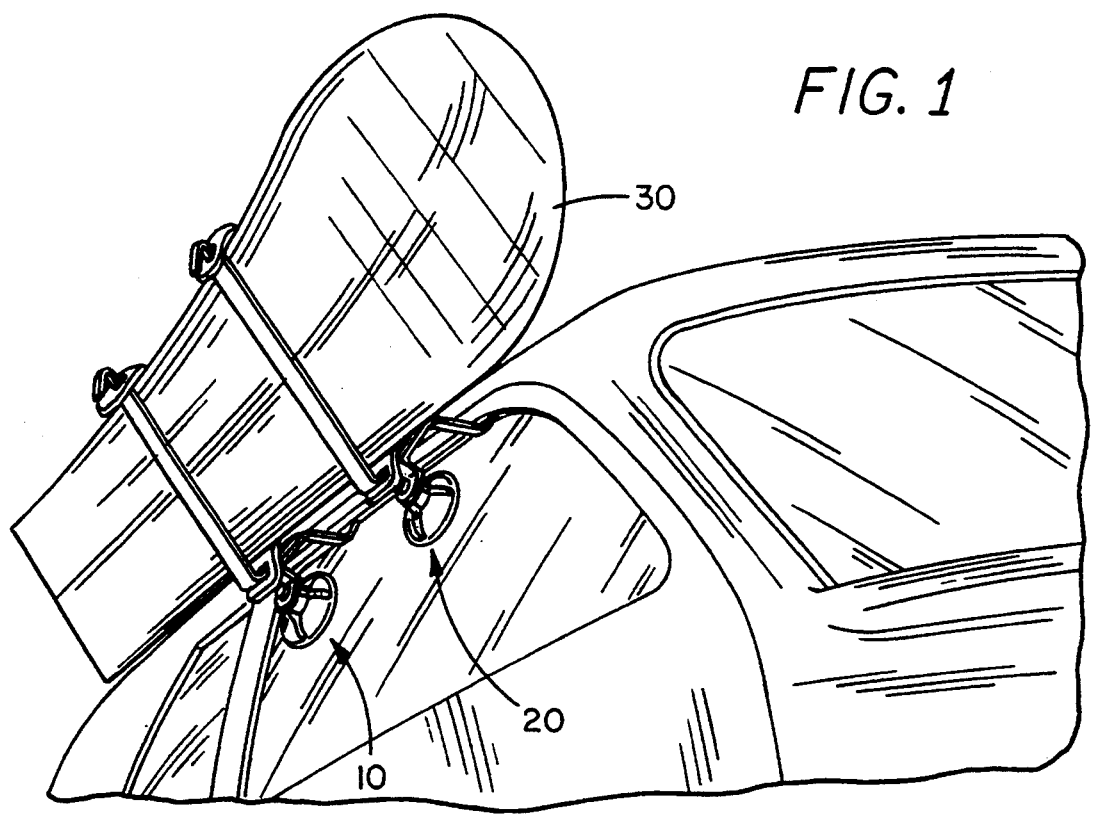
FIG. 1 is a perspective view showing a snowboard rack according to the present invention mounted to the exterior surface of the window of an automobile.

Turning now to FIG. 1, a snowboard carrier, according to the invention, is shown attached to the exterior service of an automobile window. According to the preferred use of the invention, two snowboard carriers, 10 and 20, are spaced apart on the window for carrying a snowboard 30. The lateral separation of the carriers 10 and 20 will vary according to the dimensions of the window. To best support snowboard 30, carriers 10 and 20 should be separated as much as possible while still maintaining contact with a flat upper edge of the window.

Figure 2:
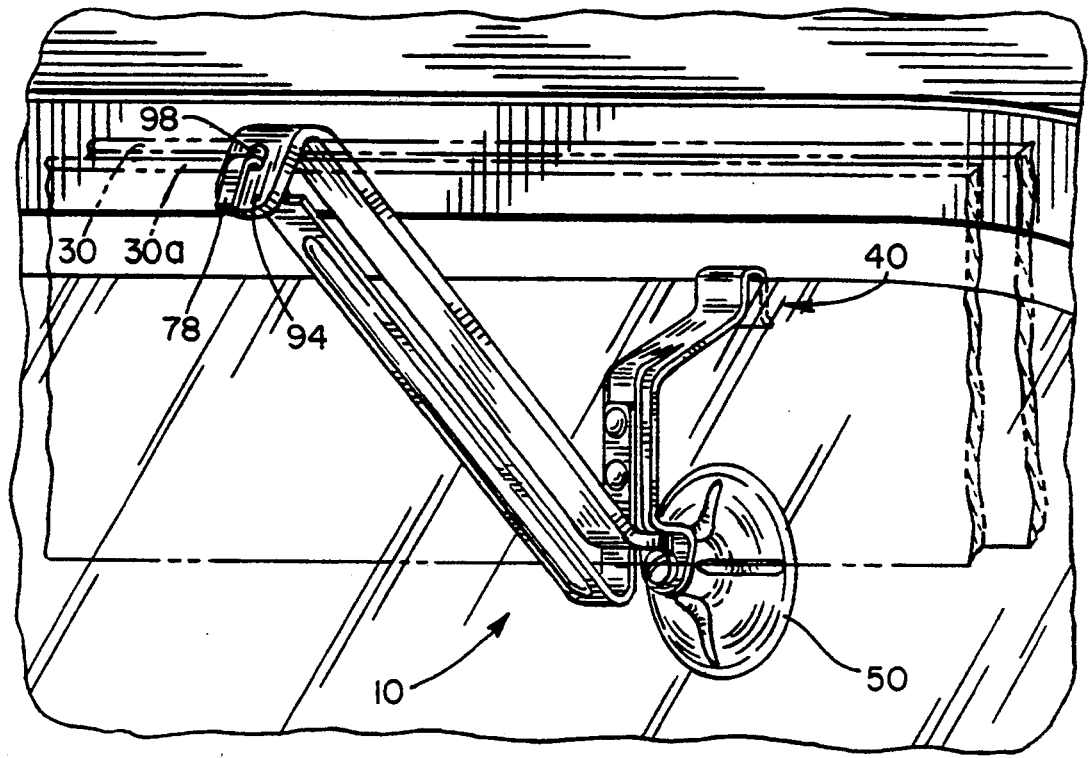
FIG. 2 is a perspective view of a snowboard carrier according to the invention, shown mounted to the exterior surface at a top edge of a window.

A closer perspective view of a snowboard carrier 10 according to the present invention is shown in FIG. 2. As can be seen from that figure, a portion of carrier 10 hookingly engages a top edge portion of the window 40. Further, a suction cup 50 is also mounted to the window exterior surface to give greater support and stability to the rack. FIG. 2 shows two snowboards 30 and 30a mounted thereon. When two snowboards are carried in this fashion, they are placed bottom to bottom with their bindings extending outwardly before being placed in the snowboard carrier 10. By such use of the carrier 10, the snowboards are securely held to the exterior surface of the vehicle, while a minimum of visual obstruction is encountered. At the same time, snowboards carried in this fashion exert a minimum of drag on the automobile, and allow the driver to carry the snowboards externally of his vehicle while still being in compliance with various safety regulations.

Figure 3:
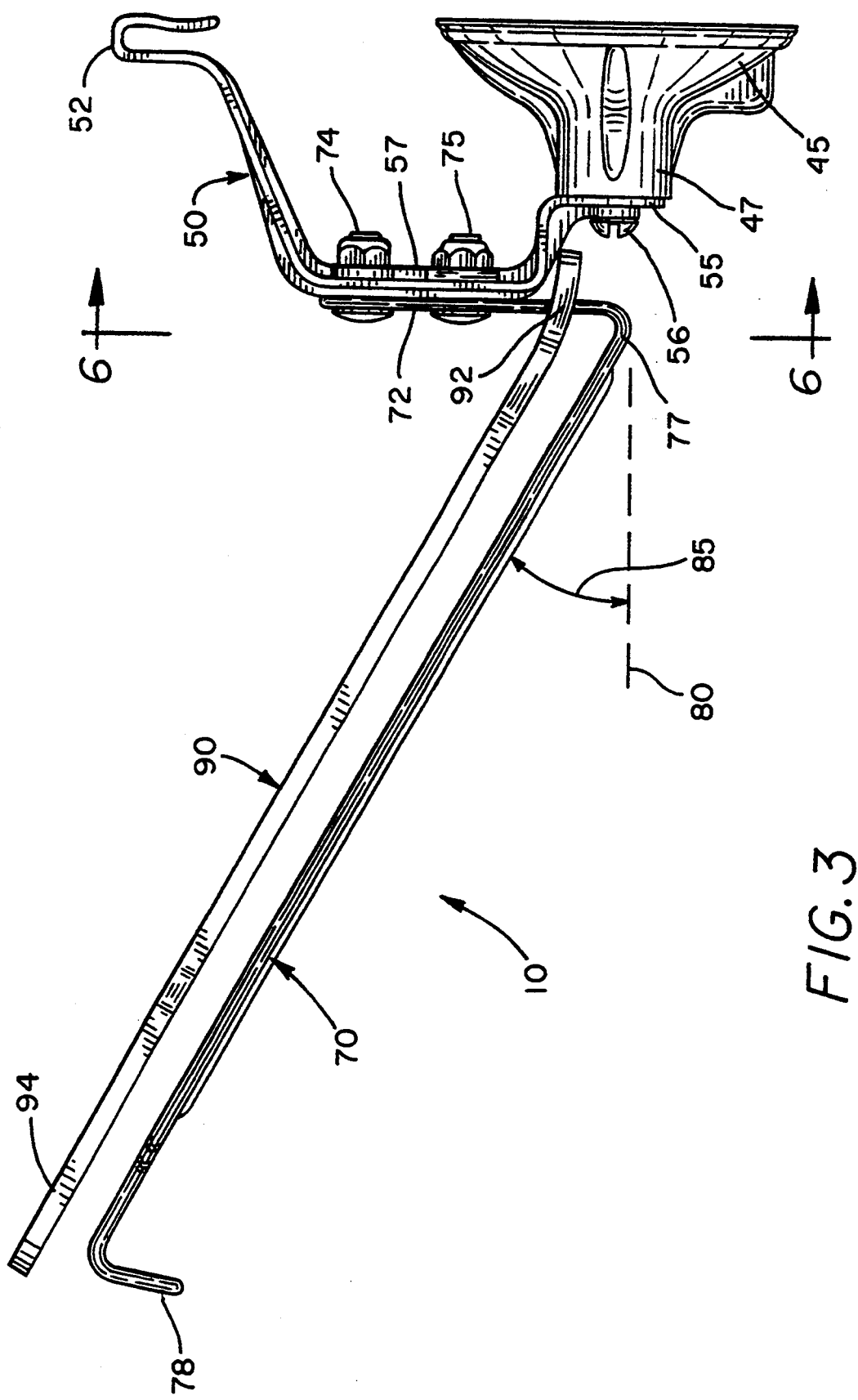
FIG. 3 is an elevational side view of a snowboard carrier according to the present invention.

FIG. 3 shows an elevational view of the snowboard carrier, and its constituent components will now be described. To mount the carrier 10 to the top portion of a window, a bracket 50 is provided with a U-shaped hanger 52. The U-shaped hanger 52, and the remainder of bracket 50 is composed of a resilient material which allows hanger 52 to adapt to various thicknesses of window. Preferably, bracket 50 is formed of a nylon material, designated by the trademark Zytel. To provide for a minimum of interference between carrier 10 and the rubber door seal into which an automobile window seats, the profile of U-shaped 52 hanger is kept as small as possible. The use of the preferred material allows for this. Thus, with U-shaped hanger in place on the top edge portion of a window, the window can be rolled into the rubber door seal sufficiently to prevent undue drafts in the vehicle while it is driven and carrying snowboard carrier 10.

The bracket 50, in addition to including U-shaped hanger 52 also has several bends throughout its length. The function of the various surfaces of bracket 52 will be described below. To provide stability and carrying strength to bracket 50, it is secured to a suction cup 45. The suction cup 45 is adapted to securely mount to the exterior surface of the automobile window. Suction cup 45 also includes a bracket-receiving means 47 which in part comprises a flat surface for receiving the downwardly-extending portion 55 of the bracket 50. A threaded screw 56 secures bracket 50 to the bracket-receiving means 47. By virtue of this configuration of the bracket 50 and the suction cup 45 snowboard carrier 10 is held in position on the window of the automobile, which increases its safety. Moreover, the configuration also increases its structural stability and allows carrier 10 to successfully absorb road shock that may be exerted upon it.

To provide an extending surface for mounting a snowboard carrier, snowboard carrier 10 includes support arm 70. An upwardly-extending portion 72 of the support arm 70 is bolted to bracket 50 intermediate the ends of the bracket at the extended flat portion 57 of the bracket. The large mating area between upwardly-extending portion 72 and flat portion 57 provides structural stability to the snowboard carrier 10. Nut and bolt combinations 74 and 75 secure portion 72 to bracket portion 57.

To give the snowboard carrier 10 the advantageous characteristics of minimal visual obstruction, low wind resistance, and a minimal projection away from the automobile, the support arm 70 extends away from the window exterior surface at a substantial angle above the horizontal, as shown at 80 in FIG. 3. This angle 85 is preferably 30 degrees or more.

Support arm 70 also has advantageous stability characteristics. The bend 77, which creates angle 85, gives support arm 70, which is made of metal, a resiliency to vibrations caused by road shock of the vehicle. The stability of support arm 70 is also increased by the fact that the length of the support arm is greater than the length of the bracket. The increased stability features of snowboard carrier 10 give it advantageous and superior function over previous such carriers.

To secure the snowboards to the support arm 70, a securing strap 90 is included. As will be discussed in greater detail below, securing strap 90 has a first end 92 secured adjacent the suction cup 45. According to the present embodiment, first end 92 is secured to the upwardly-extending portion 72 of the support arm 70. A second end 94 is adapted to engage the end 78 of support arm 70 furthest from the suction cup.

To provide for this engagement between securing strap 90 and support arm 70, second end 94 includes openings adapted to receive the hook end 78 of the support arm. The engagement can be seen most clearly in FIG. 2. With the snowboards 30, 30a in place, the securing strap passes over the top surface, undergoes a 90 degree turn, and is secured on the hook end 78.

Figure 6:
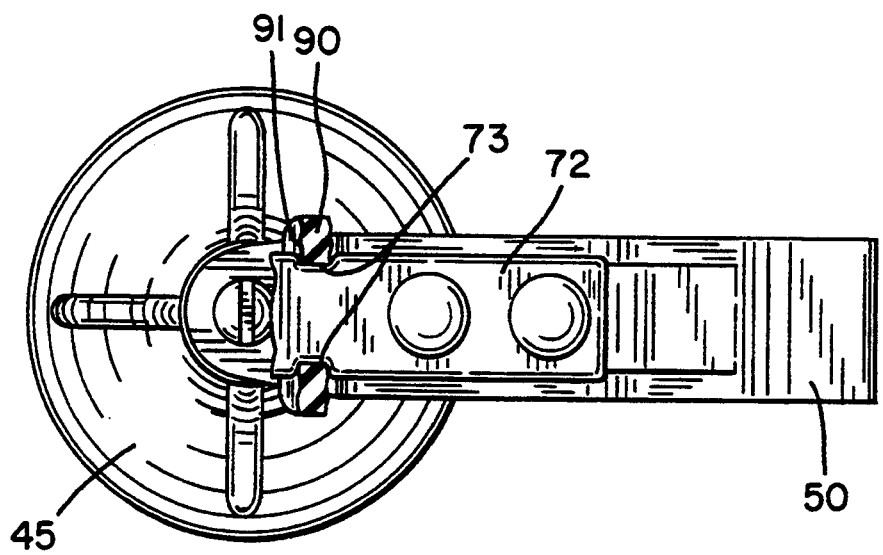
FIG. 6 is an elevational front view of the snowboard carrier according to the invention.
Figure 7:
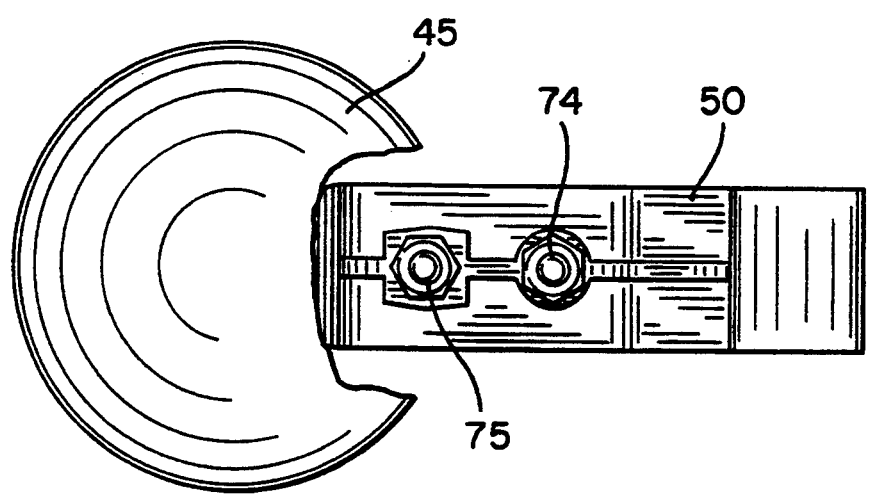
FIG. 7 is an elevational rear view of the snowboard carrier according to the invention.

Turning now to FIGS. 6 and 7, the means by which first end 92 of securing strap 90 is secured adjacent to suction cup 45 will be described in greater detail. The upwardly-extending portion 72 of the support arm 70 includes a pair of notches. The securing strap 90, which is made of a stretchable rubber-like material, includes an opening 91 which is designed to snugly fit the area of the notches 73. To mount the securing strap 90 on support arm 70, this opening 91 is first passed over hooked end 78 of the support arm 70. This operation can be best understood in reference to FIG. 3. Opening 91 is then slid over the length of support arm 70, and around bend 77. Such an action is made possible by the fact that the securing strap 90 is made of the stretchable material. Once the opening 91 is in the position shown in FIG. 6, that is surrounding notched area 73, it is securely held in place. This is due to the fact that the resiliency of the strap 90 causes opening 91 to close around the area of the notches 73. Furthermore, the angling sidewalls of the notches 73 serves as a barrier to movement of the strap 90.

To completely understand the operation of the invention, a brief overview of the operation wherein the snowboards are secured in carrier 10 will now be described in reference to FIG. 3. The snowboards (not shown) would first be positioned on the upper surface of the support arm 70. Once properly positioned, securing strap 90 would be pulled over the top surface of the boards, and then bent over the boards so that one of the openings in the second end 94 could be engaged on the hook portion 78 of the support arm 70. The openings in the second end 94 are shown most clearly in FIG. 4 and are designated by reference numerals 98 and 99. Two openings are preferably provided to allow the securing strap to be adjusted to carry either one or two snowboards simultaneously. FIG. 2 shows two snowboards secured to a carrier 10 in the manner just described.

Thus, in accordance with the invention, there is provided a snowboard carrier that gives safe and reliable operation and is adaptable to a variety of windows. Moreover, the snowboard provides for maximum visibility while also providing superior stability and resistance to movement or vibration caused by road shock. The snowboard, which includes a 30 degree angle above the horizontal also gives excellent visibility to occupants of the automobile, and causes a minimum drag on the automobile as it is driven. Moreover, the snowboard projects a minimum distance away from the automobile profile. The snowboard carrier is of simple construction and is inexpensive to manufacture.

What is claimed is:

1. A snowboard carrier, adapted to be mounted to a roll-down window of an automotive vehicle, comprising in combination:

a suction cup for securement to an exterior surface of the window and including a bracket-receiving means;

a bracket having two ends and a bend intermediate the ends, one end of the bracket being secured to the bracket-receiving means, and the other end forming a U-shaped hanger for engaging a top edge portion of the window;

a support arm having a length sufficient to underlie the entire width of a mounted snowboard and having one end secured to the bracket intermediate the ends of the bracket, the support arm extending away from the window exterior surface at a substantial angle above the horizontal, the support arm including a hooked end opposite the end secured to the bracket the length of the support arm being greater than the length of the bracket; and a securing strap having a first end secured adjacent the suction cup, and a second end including openings adapted to receive the hook end of the support arm.

2. The snowboard carrier of claim 1, wherein the bracket is composed of nylon.

3. The snowboard carrier of claim 2, wherein the U-shaped hanger is flexible and is adapted to securely engage windows of varying thicknesses.

4. The snowboard carrier of claim 1, wherein the angle above the horizontal of the support arm is 30°.

5. The snowboard carrier of claim 1, wherein the securing strap is made of stretchable material.

6. The snowboard carrier of claim 5, wherein the support arm has an upper surface and a lower surface, the hook portion extending downwardly from the lower surface, the securing strap being disposed such that the snowboards being carried are secured between the securing strap and the upper surface of the support arm.

7. The snowboard carrier of claim 1, wherein the bracket is secured by a bolt to the bracket-receiving means.

8. The snowboard carrier of claim 7, wherein the support arm includes a vertical tab including bolt holes and wherein bolts secure the vertical tab to a vertically disposed flat portion of the bracket.

9. In a carrier adapted to be mounted to a window of an automobile and including a mounting bracket for mounting to a window edge, a stabilizing suction cup attached to the mounting bracket, at least one support arm mounted to the bracket and adapted for receiving the carried articles, and a securing strap for securing the carried articles to the support arm, the improvement comprising:

a first end of the support arm including opposed notches for receiving a securing strap; and a securing strap including an opening adjacent a first end, the opening being smaller than the width of the support arm at the notches, the securing strap being resilient, whereby it is secured to the support arm when the opening is disposed in the notches.

10. The automotive-mounted carrier of claim 9, wherein the opening is rectangular.

11. The automotive-mounted carrier of claim 9, wherein the support arm also includes a hook portion at the end opposite the first end, and the securing strap includes openings at the end opposite the first end which are receivable on the hook portion to allow the carried article to be secured between the support arm and the securing member.

* * * * *